United States Patent
Gheorghioiu et al.

(10) Patent No.: US 7,475,090 B2
(45) Date of Patent: Jan. 6, 2009

(54) METHOD AND APPARATUS FOR MOVING DATA FROM AN EXTENSIBLE MARKUP LANGUAGE FORMAT TO NORMALIZED FORMAT

(75) Inventors: Ovidiu Gheorghioiu, Mountain View, CA (US); Christian Lita, Austin, TX (US); Ernest R. Plassmann, Pflugerville, TX (US); Karthikeyan Ramamoorthy, Austin, TX (US); Jayashree Ramanathan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 11/560,168

(22) Filed: Nov. 15, 2006

(65) Prior Publication Data

US 2008/0114802 A1    May 15, 2008

(51) Int. Cl.
*G06F 17/00* (2006.01)
(52) U.S. Cl. ........................................ 707/102; 707/100
(58) Field of Classification Search ......... 707/100–102; 715/205, 234, 236
See application file for complete search history.

(56) References Cited

U.S. PATENT DOCUMENTS

| | | | |
|---|---|---|---|
| 7,031,981 | B1 | 4/2006 | DeLuca et al. |
| 2002/0128925 | A1* | 9/2002 | Angeles .................. 705/26 |
| 2004/0128169 | A1 | 7/2004 | Lusen |
| 2004/0133848 | A1* | 7/2004 | Hunt et al. .............. 715/500 |
| 2005/0004947 | A1 | 1/2005 | Emlet et al. |
| 2005/0278291 | A1 | 12/2005 | Barrette et al. |
| 2006/0020886 | A1 | 1/2006 | Agrawal et al. |
| 2006/0136436 | A1 | 6/2006 | Aftab et al. |
| 2006/0236225 | A1* | 10/2006 | Achilles et al. ............ 715/513 |

* cited by examiner

Primary Examiner—Uyen T Le
(74) Attorney, Agent, or Firm—Duke W. Yee; Jeffrey S. LaBaw

(57) ABSTRACT

A computer implemented method, apparatus, and computer usable program code for creating normalized data from markup language data. User defined parameters are received for retrieving event data, wherein the parameters define a type of event and a subset of attributes for the type of event. In response to receiving the parameters, a process is configured using the type of event and the subset of attributes for the type of event to form a configured process. A set of records is processed using the configured process, wherein the configured process places data corresponding to each attribute in the subset of attributes for the type of event from the set of records into a table to form the normalized data.

20 Claims, 6 Drawing Sheets

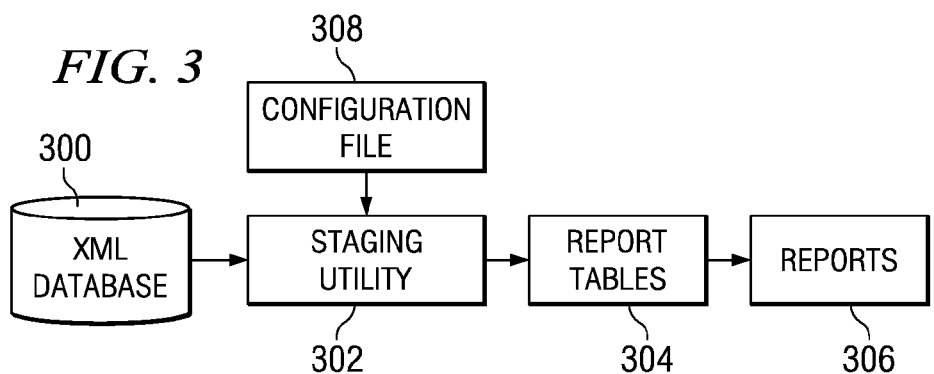
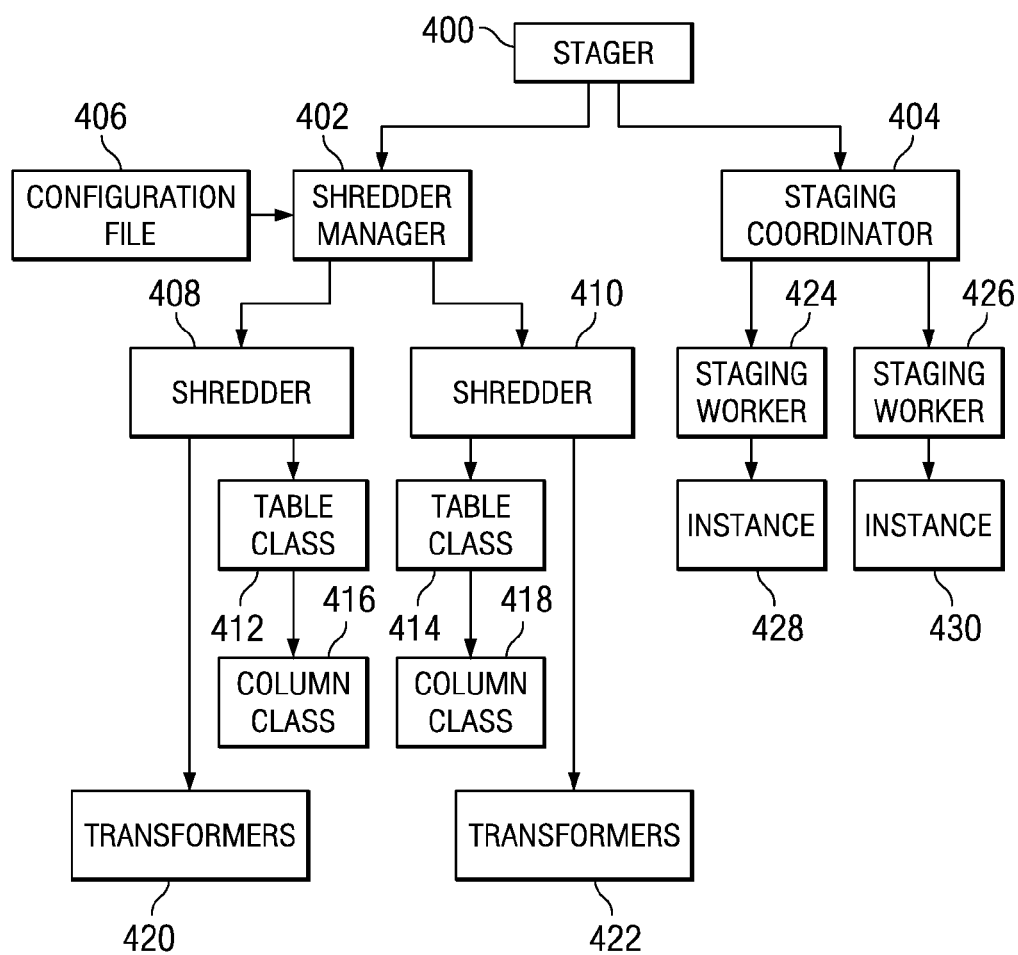

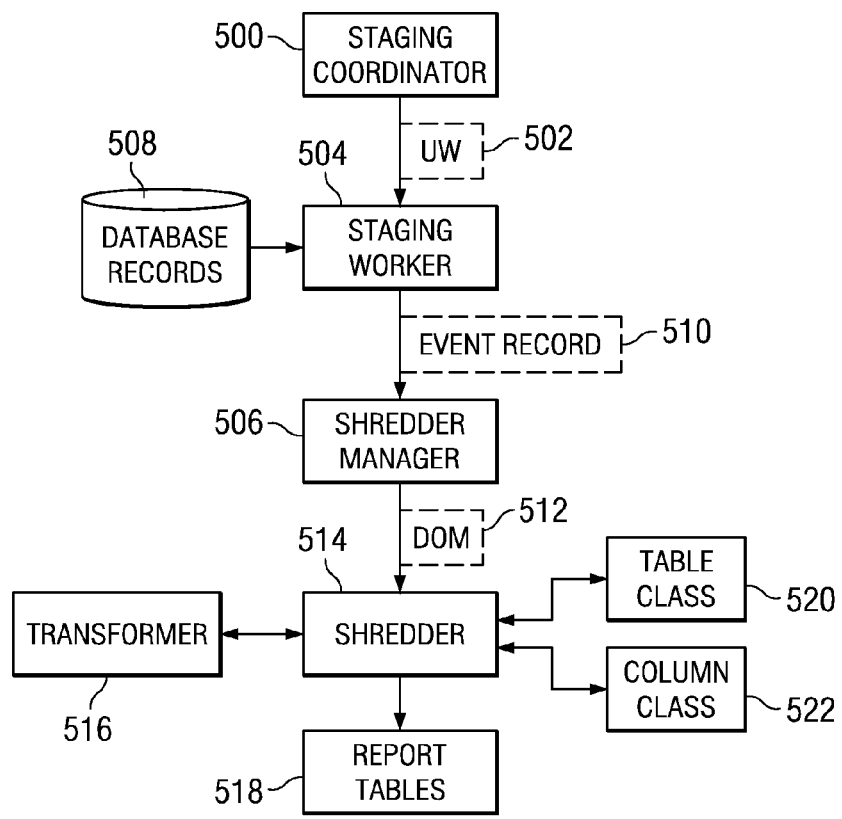

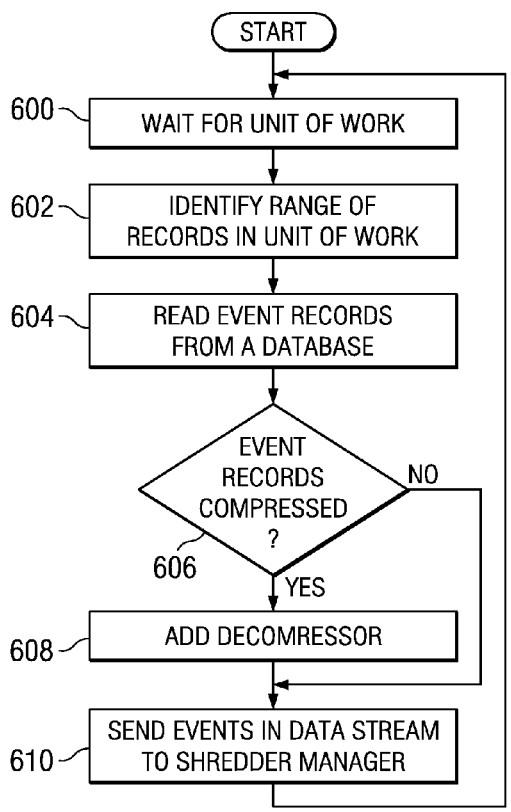
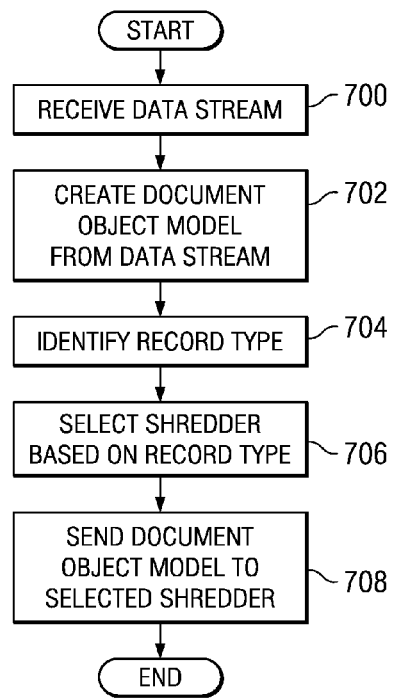
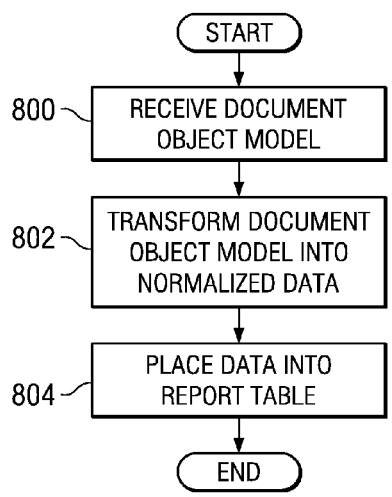

FIG. 10

```
<?xml version="1.0" encoding="UTF-8"?> <xsl:stylesheet version="1.0" xmlns:xsl="
http://www.w3.org/1999/XSL/Transform" xmlns:xsi="http://www.w3.org/2001/XMLSchema-instance"
xmlns:xalan="http://xml.apache.org/xslt"> <xsl:output method="text" /> <xsl:strip-space
elements="*" /> <xsl:template name="len-val"> <xsl:param name="value" /> <xsl:value-of
select="string-length($value)"/> <xsl:text>,</xsl:text> <xsl:value-of
select="$value"/> </xsl:template> <xsl:template match="/">
```
1002

```
<xsl:text>CARS_T_EVENT,SRC_LOCATION,</xsl:text>          ← 1004
<xsl:call-template name="len-val">
<xsl:with-param name="value" select="CommonBaseEvent/sourceComponentId/@location"/>
</xsl:call-template>
...

<xsl:text>CARS_T_EVENT,SRC_COMP,</xsl:text>          ← 1006
<xsl:call-template name="len-val">
<xsl:with-param name="value" select="CommonBaseEvent/sourceComponentId/@component"/>
</xsl:call-template>
..

<xsl:text>CARS_T_AUTHZ,RES_NAME_IN_APP,</xsl:text>
<xsl:call-template name="len-val">
<xsl:with-param name="value"
select="CommonBaseEvent/extendedDataElements[@name='resourceInfo']/
children[@name='nameInApp']/va
lues"/>
</xsl:call-template>          ← 1008

<xsl:text>CARS_T_AUTHZ,RES_NAME_IN_PLCY,</xsl:text>
<xsl:call-template name="len-val">
<xsl:with-param name="value"
select="CommonBaseEvent/extendedDataElements[@name='resourceInfo']/
children[@name='nameInPolicy']
/values"/>
</xsl:call-template>          ← 1010

</xsl:template> </xsl:stylesheet>
```
1000

FIG. 11

CARS_T_EVENT,SRC_LOCATION,22,kumarsu.austin.ibm.com ⸺1102
CARS_T_EVENT,SRC_COMP,47,IBM Tivoli Access Manager for Operating Systems ⸺1104
CARS_T_AUTHZ,RES_NAME_IN_APP,13,Not Available ⸺1106
CARS_T_AUTHZ,RES_NAME_IN_PLCY,23,/TestApp/ManagementData ⸺1108

```
<extendedDataElements name="resourceInfo" type="string">
    <values>CARSComplexType:CARSAuditResourceInfo</values>
    <children name="nameInApp" type="string">
        <values>Not Available</values>
    </children>
    <children name="nameInPolicy" type="string">
        <values>/TestApp/ManagementData</values>
    </children>
    <children name="type" type="string">
        <values>protectedResource</values>
    </children>
</extendedDataElements>
```

1200

METHOD AND APPARATUS FOR MOVING DATA FROM AN EXTENSIBLE MARKUP LANGUAGE FORMAT TO NORMALIZED FORMAT

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer useable program code for moving data from an extensible markup language format to a normalized format to generate reports.

2. Description of the Related Art

A database is a collection of information. This information is typically stored as records in which the records are organized using a structural description of the type of information in the database through a schema. One type of database is an extensible markup language (XML) database. An extensible markup language database may provide a logical model to group documents, which are called collections. These collections may be created and managed one at a time. In some implementations, collections may be organized in a hierarchical fashion in much the same way as an operating system directory. An extensible markup language database may be queried using a language, such as extensible markup language path language, (XPath). This language is an expression language for addressing portions of an extensible markup language document or for computing values based on the content of an extensible markup language document. The data may be received in extensible markup language format or converted to an extensible markup language format for storage. The events may be, for example, orders or financial transactions.

In generating reports, queries are run or made against the data in a database. Running queries against a database in which data is also being stored, may cause performance issues with writing and reading of data occurring at the same time. For example, a reporting tool may desire to run selection criteria against data in an extensible markup language database. This type of direct querying is not possible because of the format of the data and a potential problem locking an entire table that will affect insertion of new events being received at the extensible markup language database. Further, the data for an event may be stored in a compressed format, which must be uncompressed before being processed by a reporting tool. Not all reporting tools may handle compressed data.

Currently, DB2 9 allows a user to store data as an extensible markup language column type and allows users to query the data using a structured query language (SQL). DB2 9 is a product available from International Business Machines Corporation. This type of solution allows users to query data in the extensible markup language database, but events are required to be stored in an uncompressed format. Other solutions allow a user to stage data to a normalized format. Staging data to a normalized format means placing the data into a format, such as a flat format, rather than in extensible markup language, for use.

SUMMARY OF THE INVENTION

The present invention provides a computer implemented method, apparatus, and computer usable program code for creating normalized data from markup language data. User defined parameters are received for retrieving event data, wherein the parameters define a type of event and a subset of attributes for the type of event. In response to receiving the parameters, a process is configured using the type of event and the subset of attributes for the type of event to form a configured process. A set of records is processed using the configured process, wherein the configured process places data corresponding to each attribute in the subset of attributes for the type of event from the set of records into a table to form the normalized data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating a system for moving data from an extensible markup language format to a normalized format in accordance with an illustrative embodiment;

FIG. 4 is a diagram illustrating components created during initialization by a staging utility in accordance with an illustrative embodiment;

FIG. 5 is a diagram illustrating data flow in shredding data in accordance with an illustrative embodiment;

FIG. 6 is a flowchart of a process for handling a unit of work in accordance with an illustrative embodiment;

FIG. 7 is a flowchart of a process for processing event records in accordance with an illustrative embodiment;

FIG. 8 is a flowchart of a process for processing a document object model in accordance with an illustrative embodiment;

FIG. 9 is a diagram illustrating an exemplary configuration file in accordance within an illustrative embodiment;

FIG. 10 is a diagram illustrating code used for generating a transformer in accordance within an illustrative embodiment;

FIG. 11 is a diagram illustrating output from a transformer in accordance within an illustrative embodiment; and FIG. 12 is a diagram illustrating a portion of an event record in accordance with an illustrative embodiment.

DETAILED DESCRIPTION OF THE PREFERRED EMBODIMENT

Figure 1:
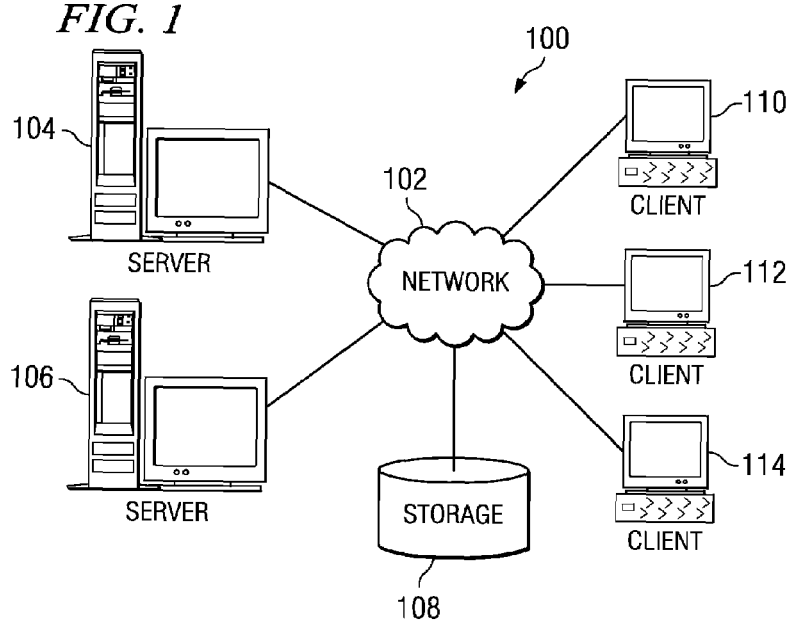
FIG. 1 is a pictorial representation of a network of data processing systems in which illustrative embodiments may be implemented.
Figure 2:
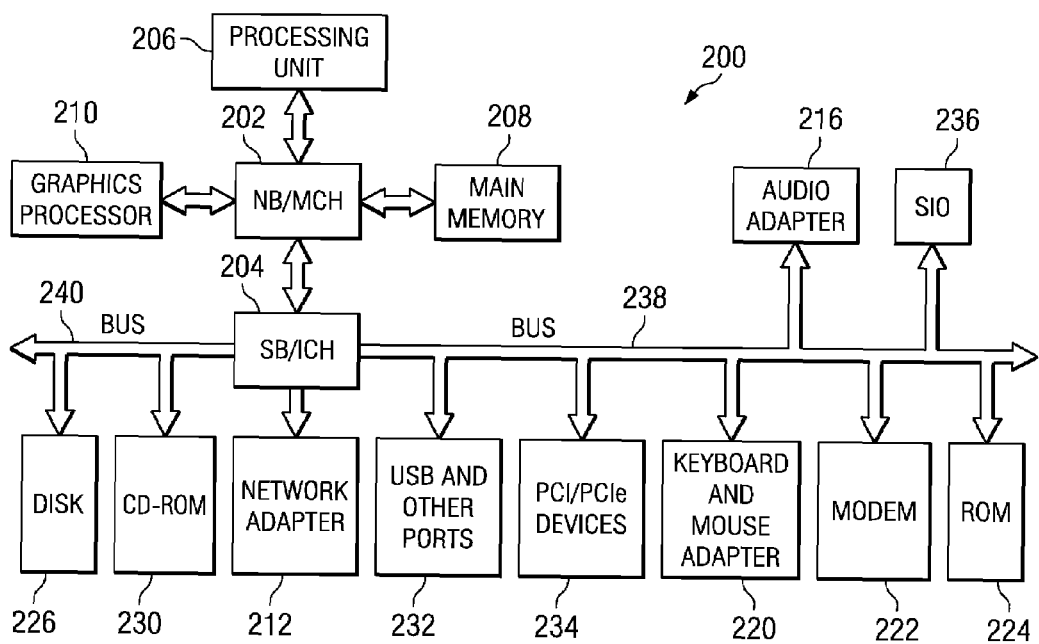
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104, which includes an extensible markup language database in this example. These clients may send events to server 104 for storage and/or may use the database to generate reports. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments recognize that the existing solutions allowing users to stage data from an extensible markup language format to a normalized format are unwieldy. These currently available solutions provide normalized data used to generate reports based on attributes predefined by the database management system. As a result, the user is not able to decide which attributes are staged.

For example, a user may query patient records that contain a date of birth, name, patient identifier, address, telephone number, and email address. The staging process implemented by the database management system returns all of these attributes. The user may only desire to obtain the name, patient identifier, and email address from the records. In order to receive only desired attributes, the user must write custom query code to obtain the desired attributes. In these examples, an attribute is a piece of information that is identified through a tag. This information is similar to information found in a field in a non-extensible markup language database.

Thus, the illustrative embodiments provide a computer implemented method, apparatus, and computer usable program code for moving data from a markup language format, such as extensible markup language, to a normalized form. This normalized form of data is the format typically used for generating reports. Again, normalized data is flat, such as listing data marked by delimiter, rather than that used in a markup language format. In particular, the process creates normalized data from markup language data. Extensible markup language provides a text-based mechanism to describe and apply a tree-based structure to data. The data, typically in the form of text, is interspersed with a markup that indicates the separation of the data into a hierarchy of character data, container-like elements, and attributes of those elements.

Parameters are received for use in retrieving, converting, and storing event data. These parameters define a type of event and a set of attributes for the type of event. In response to receiving parameters, a process is configured using the type of event and the set of attributes for the type of event. A set of instructions is generated and executed in the configured process which finds specific elements in the markup language data that match the attributes specified for the event. This configured process then places data corresponding to each selected element into a table to form the normalized data. Normalized data is data without structure. In other words, normalized data is not associated with tags and not organized into some structured or hierarchical format.

In these illustrative examples, extensible markup language data, which is data in a tree-based structure, is reformatted to remove the structuring such that only the data is present. This normalized data is placed in tables for generation of reports. The parameters, in these examples, are received as a user input in the form of a configuration file. In this manner, users may define the different attributes wanted from different types of events for use in generating reports or other analysis.

Turning now to FIG. 3, the diagram illustrating a system for moving data from an extensible markup language format to a normalized format is depicted in accordance with an illustrative embodiment. In this example, data in an extensible markup language (XML) database 300 stores events in an extensible markup language format. Staging utility 302 is used to retrieve records from extensible markup language database 300 and place the information from those records into report tables 304 in a normalized format.

Thereafter, reports 306 may be generated from report tables 304. In these examples, users define the types of events and attributes for those events that are to be placed into report tables 304 by staging utility 302. These definitions are placed into configuration file 308. In this manner, a user may select only a subset of attributes that may be present for a particular type of event for placement in report tables 304. Report tables 304 may be tailored specifically for generating reports 306 rather than containing additional unnecessary attributes. With only a subset of attributes present, space is saved in report tables 304. The use of configuration file 308 also avoids users having to write queries specifically for the attributes that they desire to use for a report. In these examples, the attributes are specified in configuration file 308 using XPath locators. An Xpath locator identifies the route or path to use to identify a node or an attribute in an extensible markup language document.

Additionally, staging utility 302 is multi-threaded to allow for simultaneous processing of records. Also the staging utility supports incremental staging to enable processing of events that have been stored since the last execution of staging utility 302. Each thread within staging utility 302 may stage or process a range of records within extensible markup language database 300. The work sent to different threads may be paced such that the threads wait to receive a new unit of work until the other threads have all processed their units of work.

Further, each thread may process a small number of events in a unit of work to limit the possibility of a transaction log becoming full and avoiding table level locking that effects insertion performance when new events are added to extensible markup language database 300. Although these examples illustrate only a single configuration file, multiple configuration files may be employed to create a virtual configuration file for configuration file 308.

Turning next to FIG. 4, a diagram illustrating components created during initialization by a staging utility is depicted in accordance with an illustrative embodiment. In this example, these components are examples of components that are created during initialization of a staging utility, such as staging utility 302 in FIG. 3.

Stager 400 is created when a staging utility is started. Stager 400 creates shredder manager 402 and staging coordinator 404. Shredder manager 402 processes configuration file 406 to identify the different shredders that will be needed to process records from a database. In these examples, configuration file 406 corresponds to configuration file 308 in FIG. 3. In these examples, shredder manager 402 creates shredder 408 and shredder 410.

Two shredders are created, in this example, for purposes of illustration and are not meant to limit the number of shredders that may be employed. For example, one shredder may be employed or ten shredders may be employed depending on configuration file 406. Each shredder is used to process a particular type of event. Thus, if configuration file 406 only defines a single event, only one shredder is created by shredder manager 402 in this example.

Shredder 408 creates table class 412, while shredder 410 creates table class 414 in these examples. One table class per shredder is created, in this example, for the purposes of illustration and is not meant to limit the number of table classes that may be created for a shredder. In turn, table class 412 creates column class 416, while table class 414 creates column class 418. One column class per table class is created, in these examples, for the purposes of illustration and is not meant to limit the number of column classes that may be created for a table class. Table class 412 and table class 414 are used to prepare instructions for inserting data into tables. In these examples, the instructions are structured query language statements.

A table class is created based on the contents of the configuration file. The configuration file specifies one or more tables that data is stored into for each type of event. In these examples, a table class is created for each table specified for each type of event. For example, a table class may be created for authorization events and another table class created for authentication events. Each table class creates a set of column classes. A set of column classes contains one or more column class. Each column class is associated with an attribute from a record that has been placed into a report table.

The identification of these attributes is found in a configuration file. For example, for a particular column class such as authorizations, creation time and a program that generated the event are examples of two attributes that may be specified. As a result, a table class for authorization events is created, and in turn, the table class includes two column classes or the creation time and the program that generated the event.

A table class prepares and uses a structured query language statement in these examples to insert data. For example, if a staging program determines that it needs to insert two columns in a first table, and needs two columns in the second table, sequential query language statements are prepared and stored in memory for repeated use each time data is to be shredded. Examples of these types of statements are as follows:

INSERT INTO CARS_T_EVENT NAME (time_stamp, src_comp) VALUES (?,?).

INSERT INTO CARS_T_AUTHZ NAME(res_name_in_app, res_name_in_plcy) VALUES (?, ?)

When a column converts data, the column converts the data into a format that will be accepted by a database for placement into a table. For example, a conversion may occur when a creation time is stored as a stream in an extensible markup language event record, but needs to be stored as a time stamp in the database. The column class converts the stream into a time stamp such that the database will accept the data. In these examples, a transformer is a Java™ class that converts an event or a portion of an event into an intermediate format for further processing.

Column class 416 and column class 418 are used to identify the data type to be used and to introspect a database, if necessary, to determine the data type. Column class 416 and column class 418 are responsible for the data conversion from the extensible markup language format into the normalized format for placement into different columns in a report table. Shredder 408 also creates transformers 420, and shredder 410 also creates transformers 422. Transformers 420 and transformers 422 are used to convert part of an event into an intermediate format for further processing.

Staging coordinator 404 creates staging worker 424 and staging worker 426 in these examples. Staging worker 424 instantiates instance 428 and staging worker 426 instantiates instance 430. Each of these instances is a copy of shredder manager 402 with the associated shredders, tables, columns, and transformers. In this manner, each staging worker may process and write data into a database independent of other staging workers because each staging worker has its own instance of the components needed to shred data. Shredding is a process that takes data in an extensible markup language format and places the data into a flat format. In other words, shredding results in normalized data.

Turning now to FIG. 5, a diagram illustrating data flow in shredding data is depicted in accordance with an illustrative embodiment. The components illustrated in FIG. 5 are examples of components in a staging utility, such as staging utility 302 in FIG. 3. In this example, staging coordinator 500 identifies unit of work (UW) 502 and sends unit of work 502 to staging worker 504. Unit of work 502 contains a range of records to be processed by staging worker 504. Staging coordinator 500 sends similar units of work to other staging workers (not shown). Only a single staging worker is depicted, in these examples, in order to clearly illustrate the data flow used to shred extensible markup language data.

In response to receiving unit of work 502, staging worker 504 initiates or makes a copy of a shredder manager created during initialization of the staging utility. Staging worker 504 queries database records 508 for records corresponding to the range identified in unit of work 502. Database records 508 are extensible markup language records, such as those found in extensible markup language database 300 in FIG. 3. An event record from database records 508 is sent to shredder manager 506 in the form of event record 510. Staging worker 504 sends a stream of event records, like event record 510 to shredder manager 506 for processing.

In response to receiving event record 510, shredder manager 506 creates document object model 512 and sends document object model 512 to shredder 514. Further, shredder manager 506 selects the appropriate shredder to process document object model 512 if more than one shredder is present. In these examples, a shredder is created for each type of event that is to be processed.

Shredder 514 then invokes a transformer, such as transformer 516 to create output, which shredder 514 places into report table 518. The information is placed into report table 518 by shredder 514 using table class 520 and column class 522.

Staging coordinator 500 may make staging worker 504 wait for another unit of work after processing unit of work 502 if other staging workers have not completed their units of work. In this manner, staging coordinator 500 ensures that none of the staging workers fall too far behind. In these examples, staging worker 504 illustrates one thread in a multi-threading process.

Turning now to FIG. 6, a flowchart of a process for handling a unit of work is depicted in accordance with an illustrative embodiment. The process illustrated in FIG. 6 may be implemented in a staging worker, such as staging worker 504 in FIG. 5.

The process begins by waiting for a unit of work (step 600). When a unit of work is received, a range of records is identified from the unit of work (step 602). Event records falling within the range are read from the database (step 604). A determination is then made as to whether the event records are compressed (step 606). If the event records are compressed, a decompressor is added (step 608). A decompressor may be attached by a staging worker to uncompress a string and restore the event to a structured string. The staging worker decompress the event records before sending them to the shredder manager. Thereafter, the events are sent in a data stream to a shredder manager for processing (step 610) with the process then returning to step 600 to wait for another unit of work. If the process determines in step 606 that event records are not compressed, the process proceeds directly to step 610.

With reference next to FIG. 7, a flowchart of a process for processing event records is depicted in accordance with an illustrative embodiment. The process illustrated in FIG. 7 may be implemented in a shredder manager, such as shredder manager 506 in FIG. 5. The process in this illustrative example receives events in the form of an extensible markup language data stream.

The process begins by receiving the data stream (step 700). Thereafter, a document object model is created from the data stream (step 702). A type of record is identified for the events in the data stream (step 704). In response to identifying a type of record, a shredder is selected based on the record type (step 706). Then, the document object model is sent to the selected shredder (step 708) with the process terminating thereafter.

Turning now to FIG. 8, a flowchart of a process for processing a document object model is depicted in accordance with an illustrative embodiment. The process illustrated in FIG. 8 may be implemented in a shredder, such as shredder 514 in FIG. 5.

The process begins by receiving a document object model (step 800). Thereafter, the document object model is transformed into normalized data (step 802). Step 802 is performed by identifying the data in the document object model and moving the needed data from this structured format. Thereafter, the data is placed into a report table (step 804) with the process terminating thereafter.

Turning now to FIG. 9, a diagram illustrating an exemplary configuration file is depicted in accordance within an illustrative embodiment. In this example, configuration file 900 contains a single type of event with a number of attributes for that event. Of course, a configuration file may include multiple events rather than only a single event as illustrated in this example. Section 902 in configuration file 900 contains parameters for use in shredding data. Lines 904, 906, 908, and 910 identify attributes for the event type identified in line 912.

In this example, the event type is an audit authorization. The different attributes to be retrieved from each record are global identifier as found in line 904, record identifier as found in line 906, location as found in line 908, and component as found in line 910. Other attributes may be present in each record for this type of event. The identified attributes are the ones that will be shredded and placed into the report table. Other attributes that may be present in a record will be discarded.

Turning now to FIG. 10, a diagram illustrating code used for generating a transformer is depicted in accordance within an illustrative embodiment. In these examples, code 1000 is depicted using extensible style sheet language to generate a transformer. Section 1002 within code 1000 contains two parameters used to define the template. The parameter name in this example is "value" with a length of a character stream that represents the value.

This template may be used to output various values in an output report. The template illustrated in code 1000 may be reusable for outputting the value and length of that value for any attribute on a report. In this example, the template is used four times for outputting four different value and length value pairs in which each corresponds to a different attribute from an event record. These different instances are found in sections 1004, 1006, 1008, and 1010.

Turning now to FIG. 11, a diagram illustrating output from a transformer is depicted in accordance within an illustrative embodiment. Output 1100 is an example of an output generated by a transformer. This particular example, the attributes are location, as found in line 1102, product or program name as found in line 1104, the name in the application as found in line 1106, and the name in the policy as found in line 1108.

An intermediate format generated by a transformer is as follows:

CARS_T_AUTHZ,RES_NAME_IN_APP,13,Not Available

CARS_T_AUTHZ,RES_NAME_IN_PLCY,23,/TestApp/ManagementData

The data "Not Available" and "/TestApp/ManagementData" is used to replace the question marks in the structural query language statements generated by the staging program.

Turning now to FIG. 12, a diagram illustrating a portion of an event record is depicted in accordance with an illustrative embodiment. In this example, data 1200 is a portion of an event that may be processed by transformer.

Thus, the different embodiments provide a computer implemented method, apparatus, and computer usable program code for creating normalized data from markup language data. In these examples, the markup language data is extensible markup language. The process received usually defines parameters for receiving event data. These parameters define a type of event and a set of attributes for the event. The set of attributes is a subset of the attributes that are present in a event record for the type of event. In response to receiving the parameters, the process is configured using the type of event and the set of attributes for the type of event to form a configured process. A set of records is processed using the configured process. This configured process places data corresponding to each attribute associated with the type of event from the set of records into a table to form normalized data.

In this manner, the data in the table may be used to generate reports. Further, table size is reduced when a subset of attributes from the possible attributes are employed in generating reports rather than using all of the attributes. Further, this process may be multi-threaded such that multiple sets of records may be processed for the same event or different events.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating normalized data from markup language data, the computer implemented method comprising:

receiving user defined parameters for retrieving event data, wherein the parameters define a type of event and a subset of attributes for the type of event;

responsive to receiving the parameters, configuring a process using the type of event and the subset of attributes for the type of event to form a configured process; and processing a set of records using the configured process, wherein the configured process places data corresponding to each attribute in the subset of attributes for the type of event from the set of records into a table to form the normalized data.

2. The computer implemented method of claim 1 further comprising:

generating a report using the normalized data.

3. The computer implemented method of claim 1, wherein an input defines a second type of event and a second subset of attributes associated with the second type of event and wherein the configuring step further comprises:

configuring a second process using the second type of event and the second subset of attributes associated with the second type of event to form a second configured process.

4. The computer implemented method of claim 3, wherein the processing step further comprises:

processing a second a set of records using the second configured process, wherein the second configured process places data corresponding to each attribute associated with the second event type from the second set of records into the table to form the normalized data.

5. The computer implemented method of claim 1, wherein the user defined parameters are received in a form of a configuration file defined by a user.

6. The computer implemented method of claim 1 further comprising:

receiving a unit of work, wherein a range of record identifiers are defined in the unit of work; and retrieving the set of records from a database using the range of record identifiers.

7. The computer implemented method of claim 1, wherein the processing step further comprises:

decompressing the set of records.

8. The computer implemented method of claim 1, wherein the process comprises a shredder, wherein the shredder uses a table class and a column class to place data corresponding to each attribute in the subset of attributes for the event type from the set of records into the table.

9. A computer program product comprising:

a computer usable medium having computer usable program code for executing creating normalized data from markup language data, the computer program medium comprising:

computer usable program code for receiving user defined parameters for retrieving event data, wherein the parameters define a type of event and a subset of attributes for the type of event;

computer usable program code, responsive to receiving the parameters, for configuring a process using the type of event and the subset of attributes for the type of event to form a configured process; and computer usable program code for processing a set of records using the configured process, wherein the configured process places data corresponding to each attribute in the subset of attributes for the type of event from the set of records into a table to form the normalized data.

10. The computer program product of claim 9 further comprising:

computer usable program code for generating a report using the normalized data.

11. The computer program product of claim 9, wherein the input defines a second type of event and a second subset of attributes associated with the second type of event and wherein the computer usable program code, responsive to receiving the parameters, for configuring a process using the type of event and the subset of attributes for the type of event to form a configured process, comprises:

computer usable program code for configuring a second process using the second type of event and the second subset of attributes associated with the second type of event to form a second configured process.

12. The computer program product of claim 11, wherein the computer usable program code for processing a set of records using the configured process, wherein the configured process places data corresponding to each attribute in the subset of attributes for the type of event from the set of records into a table to form the normalized data further comprises:

computer usable program code for processing a second a set of records using the second configured process, wherein the second configured process places data corresponding to each attribute associated with the second event type from the second set of records into the table to form the normalized data.

13. The computer program product of claim 9, wherein the user defined parameters are received in a form of a configuration file defined by a user.

14. The computer program product of claim 9 further comprising:

computer usable program code for receiving a unit of work, wherein a range of record identifiers are defined in the unit of work; and computer usable program code for retrieving the set of records from a database using the range of record identifiers.

15. The computer program product of claim 9, wherein the computer usable program code for processing a set of records using the configured process, wherein the configured process places data corresponding to each attribute in the subset of attributes for the type of event from the set of records into a table to form the normalized data further comprises:

computer usable program code for decompressing the set of records.

16. The computer program product of claim 9, wherein the process comprises a shredder, wherein the shredder uses a table class and a column class to place data corresponding to each attribute in the subset of attributes for the event type from the set of records into the table.

17. A data processing system comprising:

a bus;

a communications unit connected to the bus;

a storage device connected to the bus, wherein the storage device includes computer usable program code; and a processor unit connected to the bus, wherein the processor unit executes the computer usable program code to receive user defined parameters for retrieving event data, wherein the parameters define a type of event and a subset of attributes for the type of event; configure a process using the type of event and the subset of attributes for the type of event to form a configured process in response to receiving the parameters; and process a set of records using the configured process, wherein the configured process places data corresponding to each attribute in the subset of attributes for the type of event from the set of records into a table to form the normalized data.

18. The data processing system of claim 17 wherein the processor unit further executes the computer usable program code to generate a report using the normalized data.

19. The data processing system of claim 17, wherein the input defines a second type of event and a second subset of attributes associated with the second type of event and wherein in executing the computer usable program code to configure a process using the type of event and the subset of attributes for the type of event to form a configured process in response to receiving the parameters, configure a second process using the second type of event and the second subset of attributes associated with the second type of event to form a second configured process.

20. The data processing system of claim 19, wherein in executing the computer usable program code for processing a set of records using the configured process, wherein the configured process places data corresponding to each attribute in the subset of attributes for the type of event from the set of records into a table to form the normalized data, the processor unit further executes the computer usable program code to process a second a set of records using the second configured process, wherein the second configured process places data corresponding to each attribute associated with the second event type from the second set of records into the table to form the normalized data.

* * * * *